US011425899B2

(12) United States Patent
Hannum et al.

(10) Patent No.: US 11,425,899 B2
(45) Date of Patent: Aug. 30, 2022

(54) ANIMAL DETERRENT ASSEMBLY

(71) Applicants: Patrick Hannum, Lakewood, CO (US); Diane Hannum, Lakewood, CO (US)

(72) Inventors: Patrick Hannum, Lakewood, CO (US); Diane Hannum, Lakewood, CO (US)

( * ) Notice: Subject to any disclaimer, the term of this patent is extended or adjusted under 35 U.S.C. 154(b) by 482 days.

(21) Appl. No.: 16/687,800

(22) Filed: Nov. 19, 2019

(65) Prior Publication Data
US 2021/0144989 A1 May 20, 2021

(51) Int. Cl.
| G08B 25/10 | (2006.01) |
| H04R 1/02 | (2006.01) |
| H04R 1/40 | (2006.01) |
| H04R 3/12 | (2006.01) |
| H04N 5/225 | (2006.01) |
| H04N 5/232 | (2006.01) |
| H04N 7/18 | (2006.01) |
| H04B 1/38 | (2015.01) |
| A01M 29/06 | (2011.01) |
| A01M 29/16 | (2011.01) |
| G06F 3/16 | (2006.01) |

(52) U.S. Cl.
CPC ............ *A01M 29/06* (2013.01); *A01M 29/16* (2013.01); *G06F 3/165* (2013.01); *G08B 25/10* (2013.01); *H04N 5/2253* (2013.01); *H04N 5/23203* (2013.01); *H04N 7/18* (2013.01); *H04R 1/025* (2013.01); *H04R 1/028* (2013.01); *H04R 1/403* (2013.01); *H04R 3/12* (2013.01); *H04B 1/38* (2013.01)

(58) Field of Classification Search
CPC . H04R 1/028; H04R 3/12; H04B 1/38; H04N 7/18; H04N 7/188; H04N 5/18; A01M 29/06
USPC .......................... 340/541, 573.1, 571, 572.4
See application file for complete search history.

(56) References Cited

U.S. PATENT DOCUMENTS

| 4,212,007 | A | 7/1980 | Reyes |
| 5,886,631 | A | 3/1999 | Ralph |
| 7,268,689 | B2 * | 9/2007 | Sulaver ................. G08B 15/00 340/541 |
| 7,411,504 | B2 | 8/2008 | Hanscom |
| 9,055,737 | B2 | 6/2015 | Matzel |
| 2005/0028720 | A1 | 2/2005 | Bell |
| 2007/0075854 | A1 | 4/2007 | Tyler |
| 2012/0312250 | A1 * | 12/2012 | Jesurum ............... A01K 15/023 119/721 |
| 2018/0077921 | A1 | 3/2018 | O'Shea |

* cited by examiner

*Primary Examiner* — Yosef K Laekemariam

(57) ABSTRACT

An animal deterrent assembly includes a housing that is positionable adjacent an area intended to be free of animals. A balloon is coupled to the housing and the balloon is inflatable present a visual deterrent for an animal. A blower is positioned within the housing to inflate the balloon. A plurality of speakers is each coupled to the housing to present an audible deterrent for the animal. A motion sensor is coupled to the housing and each of the blower and the speakers is turned on when the motion sensor senses motion of the animal. A transceiver is coupled to the housing to communicate an alert to thereby alerting a user that the animal has approached the area.

11 Claims, 4 Drawing Sheets

ANIMAL DETERRENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to deterrent devices and more particularly pertains to a new deterrent device for deterring an animal from entering a restricted area.

(2) Description of Related Art Including Information Disclosed Under 37 CFR 1.97 and 1.98

The prior art relates to deterrent devices. The prior art discloses a plurality of inflatable objects that are coupled to a transport line thereby facilitating the inflatable objects to be moved around for deterring animals. The prior art also discloses a variety of home invasion alarms that feature an audible alarm comprising the sound of a barking dog. Additionally, the prior art discloses a mannequin with movable parts that are actuated via motion sensing technology to simulate the appearance of a predatory animal. The prior art also discloses an inflatable figure that is carried on a hiker such that the figure can be manually inflated to frighten a wild animal that the hiker encounters.

BRIEF SUMMARY OF THE INVENTION

An embodiment of the disclosure meets the needs presented above by generally comprising a housing that is positionable adjacent an area intended to be free of animals. A balloon is coupled to the housing and the balloon is inflatable present a visual deterrent for an animal. A blower is positioned within the housing to inflate the balloon. A plurality of speakers is each coupled to the housing to present an audible deterrent for the animal. A motion sensor is coupled to the housing and each of the blower and the speakers is turned on when the motion sensor senses motion of the animal. A transceiver is coupled to the housing to communicate an alert to thereby alerting a user that the animal has approached the area.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
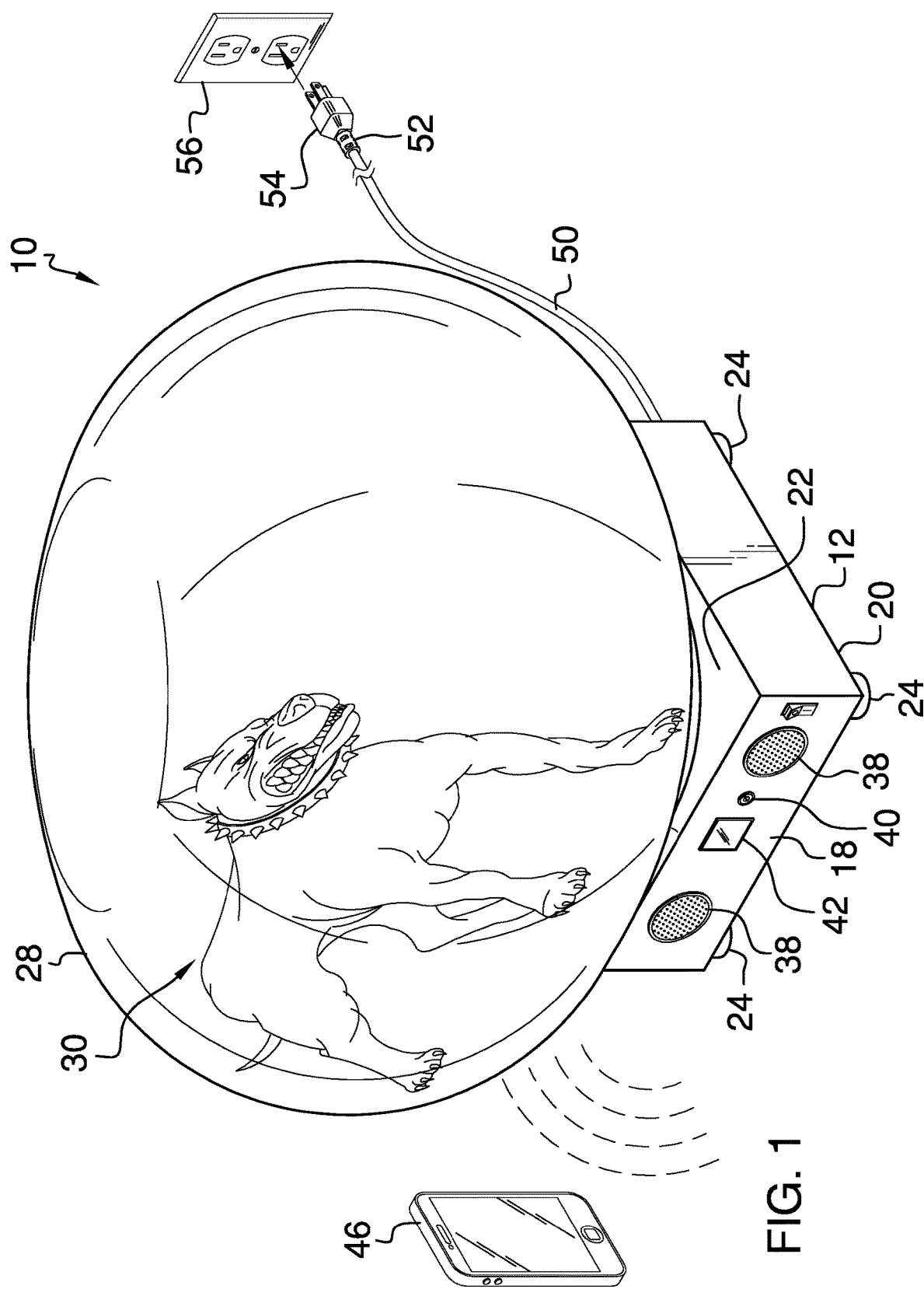
FIG. 1 is a perspective view of an animal deterrent assembly according to an embodiment of the disclosure.
Figure 2:
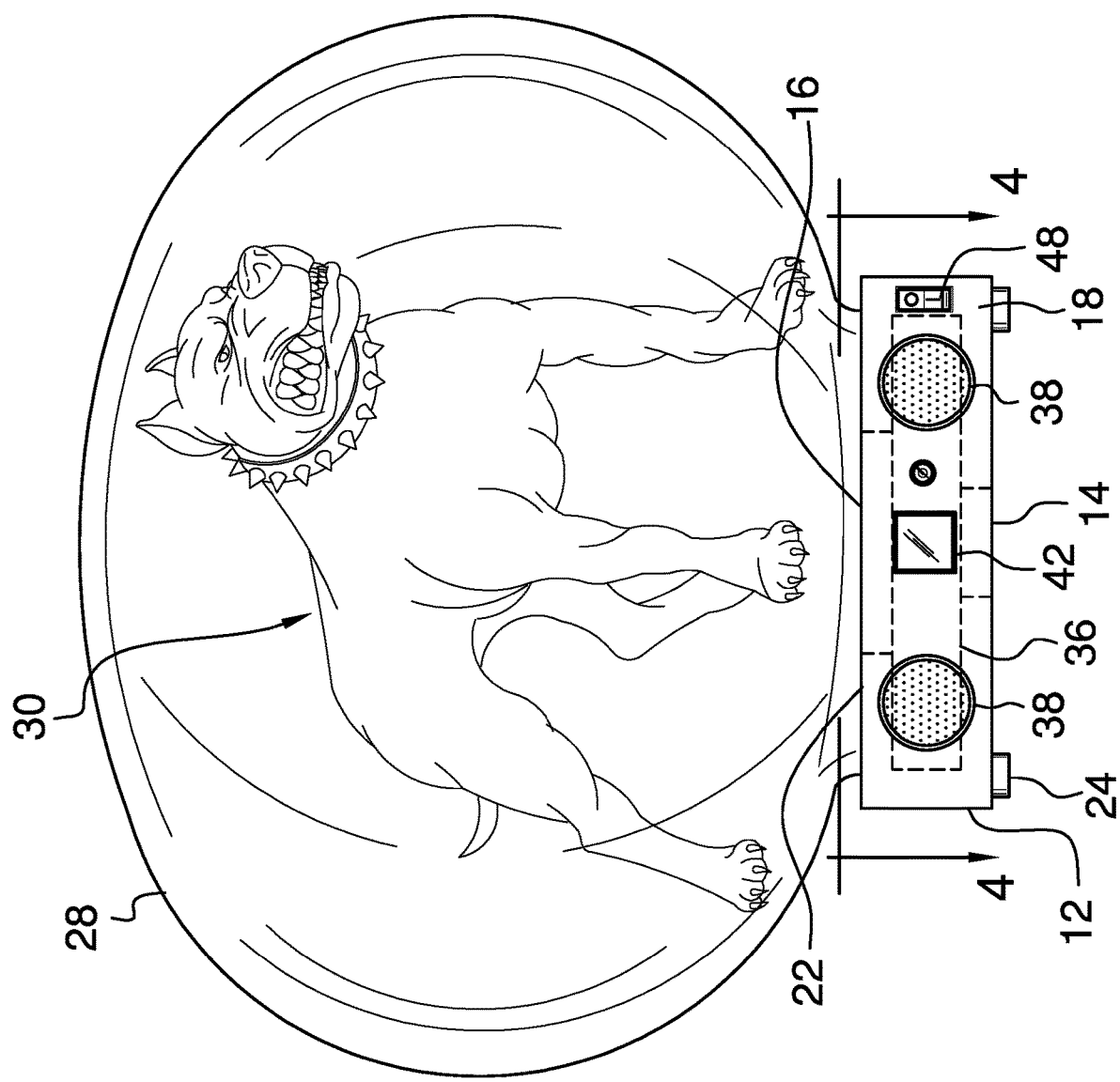
FIG. 2 is a front view of an embodiment of the disclosure.
Figure 3:
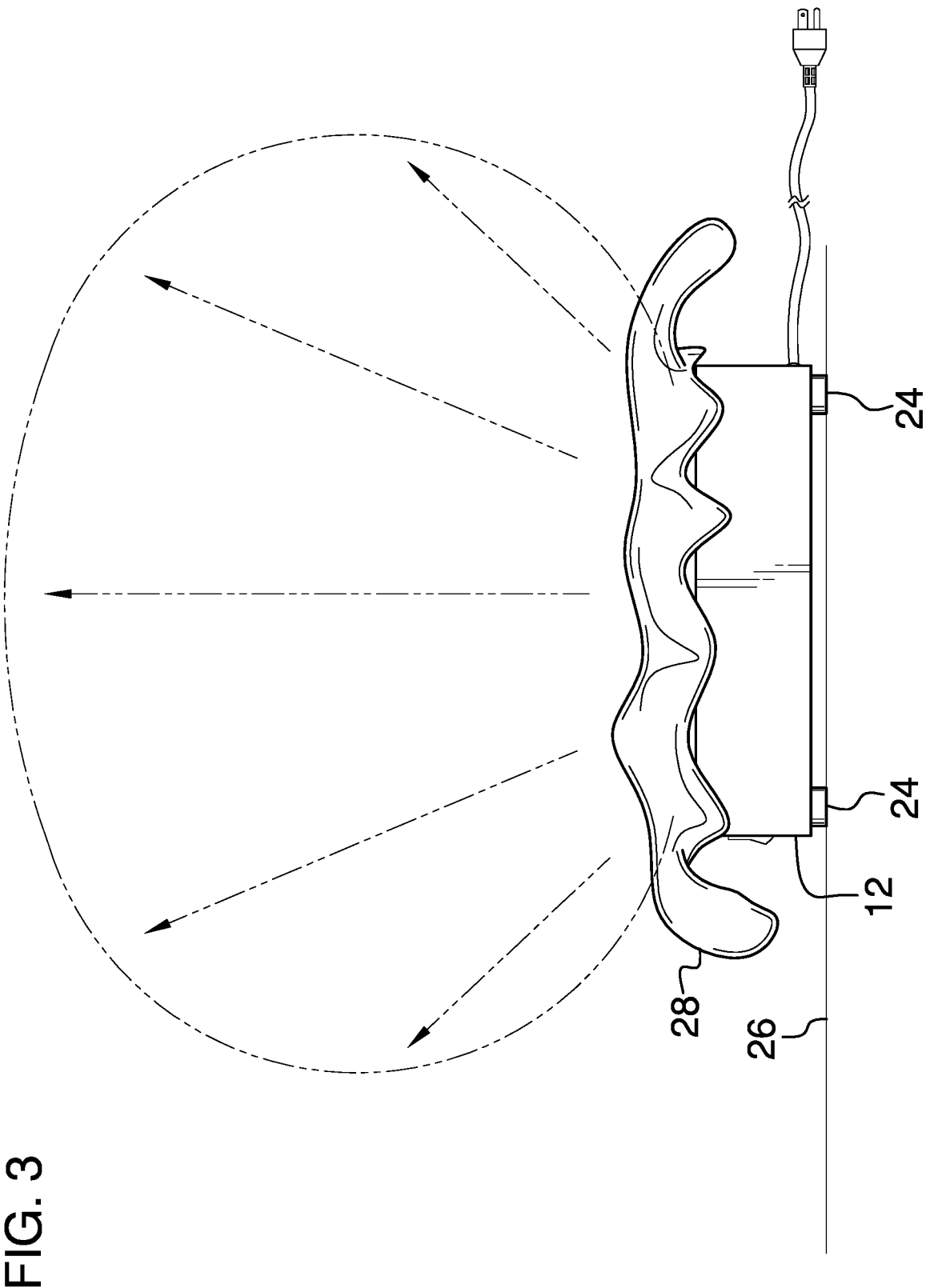
FIG. 3 is a back view of an embodiment of the disclosure.
Figure 4:
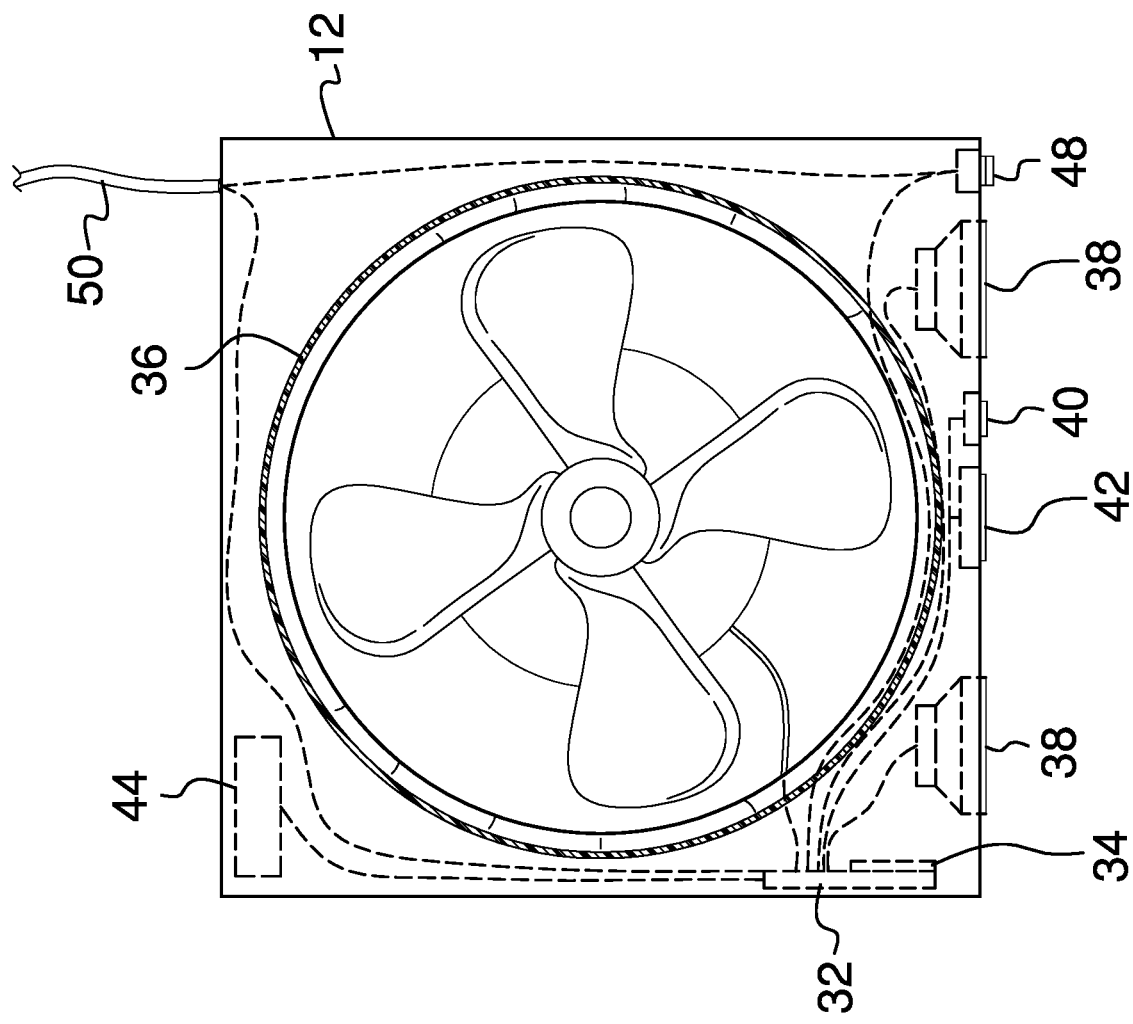
FIG. 4 is a cross sectional view taken along line 4-4 of FIG. 2 of an embodiment of the disclosure.

With reference now to the drawings, and in particular to FIGS. 1 through 4 thereof, a new deterrent device embodying the principles and concepts of an embodiment of the disclosure and generally designated by the reference numeral 10 will be described.

As best illustrated in FIGS. 1 through 4, the animal deterrent assembly 10 generally comprises a housing 12 is positionable adjacent an area intended to be free of animals. The area may a yard of a residence or any other area outdoors. The housing 12 has an intake 14 and an exhaust 16 wherein the housing 12 is configured to pass air through the intake 14 and the exhaust 16. The housing 12 has a front wall 18, a bottom wall 20 and a top wall 22, and the exhaust 16 is positioned on the top wall 22. A plurality of feet 24 is each coupled to and extends downwardly from the bottom wall 20 of the housing 12 to support the housing 12 above a support surface 26.

A balloon 28 is coupled to the housing 12 and the balloon 28 is inflatable to present a visual deterrent for an animal. The balloon 28 is positioned on the top wall 22 of the housing 12. Additionally, the balloon 28 is in fluid communication with the exhaust 16 such that the balloon 28 is inflated with air passing through the exhaust 16. The balloon 28 has indicia 30 are printed thereon and the indicia 30 comprise an image of a barking dog to frighten the animal. The animal may be any wild animal that has wandered into the yard of the residence.

A control circuit 32 is coupled to the housing 12 and the control circuit 32 receives an alert input. An electronic memory 34 is coupled to the housing 12 and the electronic memory 34 is electrically coupled to the control circuit 32. The electronic memory 34 stores audio data comprising the sounds of a dog barking. The electronic memory 34 may comprise RAM or other digital data storage.

A blower 36 is provided and the blower 36 is positioned within the housing 12. The blower 36 is in fluid communication with the intake 14 and the exhaust 16. The blower 36 urges air inwardly through the intake 14 and outwardly through the exhaust 16 when the blower 36 is turned on. Thus, the blower 36 inflates the balloon 28 when the blower 36 is turned on. The balloon 28 deflates when the blower 36 is turned off. The blower 36 is electrically coupled to the control circuit 32 and the blower 36 is turned on when the control circuit 32 receives the alert input. Additionally, the blower 36 is turned off after a pre-determined duration of time. The blower 36 may include an electric motor and a fan that is rotatably coupled to the electric motor.

A plurality of speakers 38 is provided and each of the speakers 38 is coupled to the housing 12. Each of the speakers 38 emits an audible alert to present an audible deterrent for the animal. Each of the speakers 38 is electrically coupled to the control circuit 32 for receiving the audio data from the electronic memory 34. Additionally, each of the speakers 38 is turned on when the control circuit 32 receives the alert input.

A video camera 40 is coupled to the housing 12 to capture video footage of the area. The video camera 40 is electrically coupled to the control circuit 32. Additionally, the video camera 40 is turned on when the control circuit 32 receives the alert input. The video camera 40 may comprise a miniaturized, digital video camera or the like.

A motion sensor 42 is coupled to the housing 12 to sense motion of the animal when the animal approaches the housing 12. Each of the blower 36 and the speakers 38 is turned on when the motion sensor 42 senses motion of the animal. The motion sensor 42 is electrically coupled to the control circuit 32 and the control circuit 32 receives the alert input when the motion sensor 42 senses motion. The motion sensor 42 may comprise an electronic motion sensor with a trigger distance ranging between approximately 20.0 feet 24 and 50.0 feet 24.

A transceiver 44 is coupled to the housing 12 and the transceiver 44 is in wireless communication with a personal electronic device 46. Thus, the personal electronic device 46 can receive an alert when the balloon 28 is inflated. In this way the transceiver 44 alerts a user that the animal has approached the area. The transceiver 44 is electrically coupled to the control circuit 32. The transceiver 44 broadcasts the alert to the personal electronic device 46 when the control circuit 32 receives the alert input. The transceiver 44 may comprise a radio frequency transceiver or the like and the personal electronic device 46 may be a smart phone or other similar device.

A power switch 48 is movably coupled to the housing 12, the power switch 48 is electrically coupled to the control circuit 32 ad the power switch 48 turns the control circuit 32 on and off. A power cord 50 is coupled to and extends away from the housing 12. The power cord 50 is electrically coupled to the control circuit 32 and the power cord 50 has a distal end 52 with respect to the housing 12. A male plug 54 is electrically coupled to the distal end 52 of the power cord 50 and the male plug 54 is pluggable into a power source 56 comprising a female electrical outlet.

In use, the housing 12 is positioned near the perimeter of an area that has been known to be encroached by wild animals. The balloon 28 is inflated and the speakers 38 emit the sound of the barking dog when the motion sensor 42 senses motion. In this way the animal that is approaching the housing 12 is frightened away. Thus, the area can be kept free of wild animals without harming the wild animals. The balloon 28 deflates and the speakers 38 are turned off after a pre-determined duration of time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An animal deterrent assembly being configured to deploy a visual deterrent and emit an audible deterrent when an animal approaches a restricted area for deterring the animal from the restricted area, said assembly comprising:
   a housing being positionable adjacent an area intended to be free of animals, said housing having an intake and an exhaust wherein said housing is configured to pass air through said intake and said exhaust;
   a balloon being coupled to said housing, said balloon being inflatable wherein said balloon is configured to present a visual deterrent for an animal, said balloon having indicia being printed thereon, said indicia comprising an image of a barking dog wherein said indicia is configured to frighten the animal;
   a blower being positioned within said housing, said blower being in fluid communication with said intake and said exhaust, said blower inflating said balloon when said blower is turned on, said balloon deflating when said blower is turned off;
   a plurality of speakers, each of said speakers being coupled to said housing, each of said speakers emitting an audible alert wherein said speakers are configured to present an audible deterrent for the animal;
   a motion sensor being coupled to said housing wherein said motion sensor is configured to sense motion of the animal when the animal approaches said housing, each of said blower and said speakers being turned on when said motion sensor senses motion of the animal; and
   a transceiver being coupled to said housing, said transceiver being in wireless communication with a personal electronic device thereby facilitating the personal electronic device to receive an alert when said balloon is inflated wherein said transceiver is configured to alert a user that the animal has approached the area.

2. The assembly according to claim 1, wherein:
   said housing has a front wall, a bottom wall and a top wall, said exhaust being positioned on said top wall;
   said assembly includes a plurality of feet, each of said feet being coupled to and extending downwardly from said bottom wall of said housing wherein said feet are configured to support said housing above a support surface; and said balloon is positioned on said top wall of said housing, said balloon being in fluid communication with said exhaust wherein said balloon is configured to be inflated with air passing through said exhaust.

3. The assembly according to claim 1, further comprising:
a control circuit being coupled to said housing, said control circuit receiving an alert input; and
an electronic memory being coupled to said housing, said electronic memory being electrically coupled to said control circuit, said electronic memory storing audio data comprising the sounds of a dog barking.

4. The assembly according to claim 3, wherein said blower is electrically coupled to said control circuit, said blower being turned on when said control circuit receives said alert input, said blower being turned off after a predetermined duration of time.

5. The assembly according to claim 4, wherein each of said speakers is electrically coupled to said control circuit for receiving the audio data from said electronic memory, each of said speakers being turned on when said control circuit receives said alert input.

6. The assembly according to claim 3, further comprising a video camera being coupled to said housing wherein said video camera is configured to capture video footage of the area, said video camera being electrically coupled to said control circuit, said video camera being turned on when said control circuit receives said alert input.

7. The assembly according to claim 3, wherein said motion sensor is electrically coupled to said control circuit, said control circuit receiving said alert input when said motion sensor senses motion.

8. The assembly according to claim 3, wherein said transceiver is electrically coupled to said control circuit, said transceiver broadcasting the alert to the personal electronic device when said control circuit receives said alert input.

9. The assembly according to claim 3, further comprising a power switch being movably coupled to said housing, said power switch being electrically coupled to said control circuit, said power switch turning said control circuit on and off.

10. The assembly according to claim 9, further comprising a power cord being coupled to and extending away from said housing, said power cord being electrically coupled to said control circuit, said power cord having a distal end with respect to said housing, said distal end having a male plug being electrically coupled thereto, said male plug being pluggable into a power source comprising a female electrical outlet.

11. An animal deterrent assembly being configured to deploy a visual deterrent and emit an audible deterrent when an animal approaches a restricted area for deterring the animal from the restricted area, said assembly comprising:
a housing being positionable adjacent an area intended to be free of animals, said housing having an intake and an exhaust wherein said housing is configured to pass air through said intake and said exhaust, said housing having a front wall, a bottom wall and a top wall, said exhaust being positioned on said top wall;
a plurality of feet, each of said feet being coupled to and extending downwardly from said bottom wall of said housing wherein said feet are configured to support said housing above a support surface;
a balloon being coupled to said housing, said balloon being inflatable wherein said balloon is configured to present a visual deterrent for an animal, said balloon being positioned on said top wall of said housing, said balloon being in fluid communication with said exhaust wherein said balloon is configured to be inflated with air passing through said exhaust, said balloon having indicia being printed thereon, said indicia comprising an image of a barking dog wherein said indicia is configured to frighten the animal;
a control circuit being coupled to said housing, said control circuit receiving an alert input;
an electronic memory being coupled to said housing, said electronic memory being electrically coupled to said control circuit, said electronic memory storing audio data comprising the sounds of a dog barking;
a blower being positioned within said housing, said blower being in fluid communication with said intake and said exhaust, said blower inflating said balloon when said blower is turned on, said balloon deflating when said blower is turned off, said blower being electrically coupled to said control circuit, said blower being turned on when said control circuit receives said alert input, said blower being turned off after a predetermined duration of time;
a plurality of speakers, each of said speakers being coupled to said housing, each of said speakers emitting an audible alert wherein said speakers are configured to present an audible deterrent for the animal, each of said speakers being electrically coupled to said control circuit for receiving the audio data from said electronic memory, each of said speakers being turned on when said control circuit receives said alert input;
a video camera being coupled to said housing wherein said video camera is configured to capture video footage of the area, said video camera being electrically coupled to said control circuit, said video camera being turned on when said control circuit receives said alert input;
a motion sensor being coupled to said housing wherein said motion sensor is configured to sense motion of the animal when the animal approaches said housing, each of said blower and said speakers being turned on when said motion sensor senses motion of the animal, said motion sensor being electrically coupled to said control circuit, said control circuit receiving said alert input when said motion sensor senses motion;
a transceiver being coupled to said housing, said transceiver being in wireless communication with a personal electronic device thereby facilitating the personal electronic device to receive an alert when said balloon is inflated wherein said transceiver is configured to alert a user that the animal has approached the area, said transceiver being electrically coupled to said control circuit, said transceiver broadcasting the alert to the personal electronic device when said control circuit receives said alert input;
a power switch being movably coupled to said housing, said power switch being electrically coupled to said control circuit, said power switch turning said control circuit on and off; and
a power cord being coupled to and extending away from said housing, said power cord being electrically coupled to said control circuit, said power cord having a distal end with respect to said housing, said distal end having a male plug being electrically coupled thereto, said male plug being pluggable into a power source comprising a female electrical outlet.

* * * * *